Feb. 28, 1933. J. J. WEBER 1,899,488
SURFACE ORNAMENTATION AND METHOD OF PRODUCING SAME
Filed June 15, 1928 2 Sheets-Sheet 1

Inventor
John J. Weber
by Frank J. Schraeder
Attorney.

Feb. 28, 1933. J. J. WEBER 1,899,488
SURFACE ORNAMENTATION AND METHOD OF PRODUCING SAME
Filed June 15, 1928   2 Sheets-Sheet 2

Inventor
John J. Weber
by Frank J. Schraeder
Attorney.

Patented Feb. 28, 1933

1,899,488

UNITED STATES PATENT OFFICE

JOHN J. WEBER, OF WILMETTE, ILLINOIS, ASSIGNOR TO J. H. JOCHUM, JR., OF CHICAGO, ILLINOIS

SURFACE ORNAMENTATION AND METHOD OF PRODUCING SAME

Application filed June 15, 1928. Serial No. 285,632.

This invention relates to a method of producing a novel decorative wall material.

It is an object of the invention to produce by a novel method a wall material of opalescent character, and for this reason to cause the different coloring ingredients to be blended into each other on the surface of the material, similar to the blending and contrasting effects which characterize opalescent substances.

It is also an object of the invention to provide a method of producing a new surface ornamentation which shows coloring effects similar to those encountered in opalescent material, and to apply this material in a series of steps to a carrier or support, as for instance the ordinary wall-boards, of which different types are on the market.

It is also an object of the invention to provide a method for producing material of this character economically and to endow the material with that stability and durability which is required for permanent buildings and similar structures.

With these and numerous other objects in view, an example of producing this novel building material has been described in the following specification in which reference is made to the accompanying drawings showing a wall material of this type in various stages of manufacture.

Figure 1:
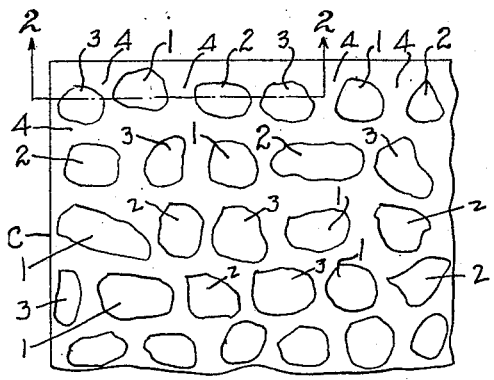
Figs. 1, 3, 5, 7, 9 and 12 are top plan views of a carrier or wall-board showing the application of materials thereon in different stages of manufacture.

The opalescence which characterizes the novel product is mainly due to the fact that isolated quantities of body or base material also containing the different coloring substance are applied to a carrier, these spaced deposits having irregular outlines and are at first spaced from each other, but are subsequently blended or merged into each other in a novel way.

The base material containing as main ingredient ordinary whiting is made up in different tones by adding to the same different coloring material. Piles, each containing as ingredients a base material and some coloring material in mixture with each other, the different piles or heaps containing different coloring materials, are prepared, in order to furnish the supply from which the individual deposits may be applied to the carrier. In the following specification reference is made to three different colors with which predetermined quantities of the base material may be mixed to form three different piles. From these piles or heaps sufficient material is successively applied to different portions of the support or carrier until the area of the support is about uniformly occupied by irregular isolated deposits and intervening bare irregular surface portions.

The base material mentioned above is a plastic substance, adapted to dry after a certain time. Any substance of this character may be used for this process. I prefer to use a base material the ingredients of which are formed by whiting and by a liquid the principal ingredients of which are preferably rye flour in mixture with water and certain quantities of an oxidizable oil, preferably linseed oil, the mixture being reduced to the necessary thin consistency of suitable selection of the proportions. The mixture of whiting and the base liquid in the proportion of 95 pounds of whiting to 8 gallons of the base liquid is termed the "base material" in the following specification.

This mixture produces a plastic base material which lends itself to the application on a flat or other surface by means of a scraper or trowel, similarly to the application of ordinary plaster on wall-boards or other carriers.

The specification also makes reference to three different principal colorings which may be incorporated with this base material. In order to produce different colored masses or piles from which the material is applied to the carrier, certain quantites of the above base material are mixed with the coloring substances.

One of these plastic masses is preferably made up in the proportion of 52 pounds of the base material to which a small quantity of Van Dyke brown is being added. The coloring is added in small quantities to the base material until the desired shade of brown has been accomplished. If it is desired to vary this mixture slightly from the monotonous brown tone a small quantity of Prussian blue may be added to the first mixture, and this may be repeated until the proper shade has been produced.

A second plastic mass is preferably made up of base material and coloring in the proportion of 52 pounds of base material to which a small quantity of pure Ultramarine blue is being added. The mass is produced in the same manner as stated above by adding small quantities of the paint, mixing it with the base material and repeating this process until the desired color is shown.

Similarly also the third one of the piles of plastic mass may be produced by mixing green with base material in the proportion of 52 pounds of base material to small quantities of Dect green in which again the coloring material is admixed in small quantities until the proper tone has been produced.

It should be noted, however, that the number of the plastic masses forming the foundation to be applied to the carrier is in no way limited to three, nor is it necessary to make up these masses or piles in the sequence described, nor shall the specification be understood to mean that no other coloring materials may be incorporated with the base material in order to produce the opalescent effect which it is desired to attain. In the following specification the three masses described specifically above are termed Nos. 1, 2 and 3 respectively, in order to simplify the description.

Small quantities of the first mass are deposited by means of a scraper or trowel on the surface of the carrier C, Fig. 1. These deposits 1 are applied in the form of irregular spaced blotches which may have (by way of example) as largest dimension across a length of about 3 inches.

Similarly deposits 2 made up of the second mass are applied to the surface of the carrier, also irregular in outline, and in similar spacing from each other but in fairly uniform relation in respect of the deposits 1, for instance. The second deposits 2 are all located to the right of the deposits 1 and spaced therefrom. From the third mass also irregular quantities are thrown by means of a scraper or the like on the carrier C, to form blotches or deposits 3, of irregular outline and relation to each other, the deposits 3, however, being located to the left of the deposits 1, so that the deposits 1 are approximately midway between the deposits 2 and 3. The sequence of colored deposits when viewing the carrier in a certain direction is, therefore, uniform, although the deposits are all irregular in outline and in size, and spaced from each other by irregular bare areas 4.

Figure 2:
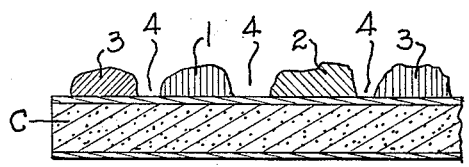
Figs. 2, 4, 6, 8, 10, 11, 13 and 14 are cross-sections thru said carrier at the same stage of manufacture, respectively.

In cross-section, Fig. 2, the board C will then have a flat surface covered with low irregular mounds of different colored materials, the several mounds being separated from each other by uncovered area portions.

In order to spread these spaced deposits 1, 2, 3 over the entire area of the carrier C, pressure is applied to the same while they are still in plastic condition. The pressure member is sufficiently yielding to produce an irregular marginal zone, in which the various blotches merge into each other, the pressure member at the same time preventing the adhesion of the plastic material to the member itself.

Figure 3:
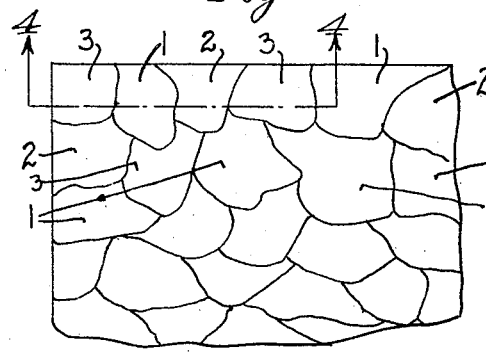

While various methods of spreading these blotches into marginal mergers have been devised, the following is the preferred process; A large rag is wrinkled up into the form of a roll so as to form a relatively soft pressure member or pad. This pad is soaked in clear, cold water until it is thoroughly wet through the entire body. This pad or roll is applied for instance by hand while in moist condition to the deposits, first squeezing or pressing down those parts of the deposits which are considerably higher than the main bodies of the same, and then causing the marginal area portions of the deposits to merge into adjacent ones, as in Figs. 3 and 4, these marginal area portions being slightly depressed, and wiped or spread in direction towards the adjacent area portions of differently colored deposits. This manipulation produces an uneven surface of the base, extending it, however, over the entire area of the board C without leaving any bare interspaces between the same.

Figure 4:
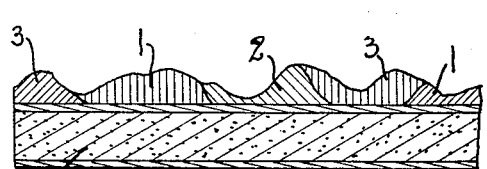

In cross-section, Fig. 4, the top surface of the mass on the carrier C presents an uneven wavy appearance. In certain places of this surface there will remain an excess of water due to the pressure of the moist pad applied to the same. The softness of the pressure member has the effect of eliminating peaks or sharp points on material. In this condition the product is permitted to dry for a period which may depend upon the ingredients and upon the treatment with the soft pressure member. The drying is permitted to proceed until the thick portions of the layer which are raised above the lower flattened portions of the mass are almost hard. The lower portions or valleys are more exposed to the influence of the water remaining standing thereon. The entire layer, therefore, after this partial drying has not the same hardness or consistency throughout, certain portions remaining softer for a longer time than others, and the oil in those portions which are dried earlier will oxidize to a higher degree than in other portions.

The variety of coloring effects due to the application of different colored deposits and to the production of the marginal mergers is then enhanced by applying glazing material to this uneven surface.

This glazing material again is applied over irregular portions of the area of the mass. The glazing material is applied in the form of coats of different shades of color, so that owing to the irregular application of the glazing material on top of the irregularly applied base material, a still greater variety of coloring is produced.

Figure 5:
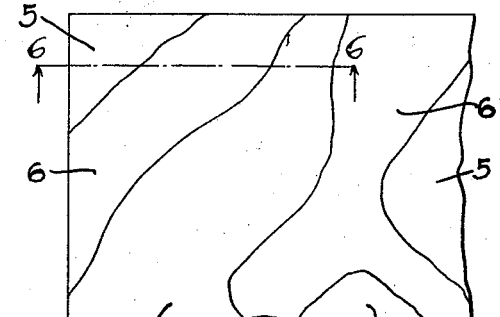
Figure 6:
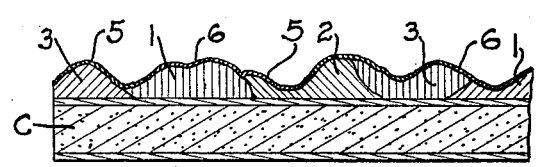

In the embodiment of the invention described herein two of these different coats of glazing materials, as indicated at 5 and 6 in Figs. 5 and 6, are applied for instance by a brush over the entire area of the board. They are applied over spaced irregular portions, but in such manner that each of these glazing materials covers approximately one-half of the entire surface. The portions over which each material is applied are not contiguous to each other, but they may extend in the form of irregular streaks 10 over the board. The streaks of one glazing material are irregularly spaced from each other and in the intervening spaces the second glazing material is brushed on.

As examples of the glazing materials the following may be given: The first glazing material is made up of the base liquid and a coloring material, the base liquid having preferably as main ingredients, a greatly diluted thinned paste of flour and water with an admixture of linseed oil. The glazing material is preferably composed of a mixture in which the base liquid enters in the proportion of two gallons to one ounce of coloring material. The coloring material for this glaze may be pure cobalt blue added in small quantities to the base liquid which latter is preferably maintained at a temperature of 150° F., and thoroughly mixed with the same until the entire one ounce of cobalt blue has been used at the rate of one ounce to two gallons of the liquid.

The second glaze again is composed of base liquid and a coloring material, namely green, preferably in the proportion of two gallons of base liquid to two ounces of dark chrome green. The admixture of the coloring material to the base liquid (which is maintained at a temperature of 150° F.) again is effected in small quantities under thorough agitation or stirring until the entire quantity of the coloring material has been used up.

It should be noted here, however, that again it is not desired to restrict the invention to the use of these particular colors or to the use of two glaze materials only.

The general contour of the board, as shown in cross-section in Fig. 6, is not disturbed thereby. After application of the glaze material the board is left standing until the glaze has become dry. This may be about four hours.

Figure 7:
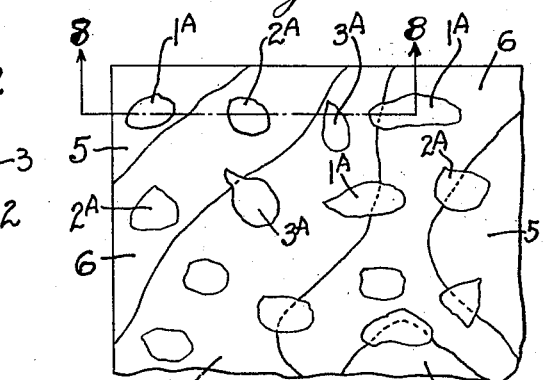
Figure 8:
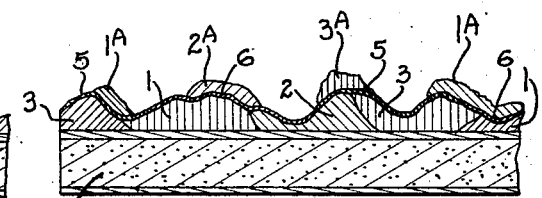

The dried board receives then a second coating or application of the base materials Nos. 1, 2 and 3, as specified above, again applied in the same manner in the form of deposits 1$^A$, 2$^A$, 3$^A$, Figs. 7 and 8 of irregular outline and irregular spacing from each other, the area of the individual deposits being preferably of the same contents, although the shapes of the areas may greatly differ from each other. In this third coat the deposits are preferably spaced further apart than in the first coat, and the last deposits of the layers of this base material may partly and irregularly cover the glazed and spread deposits 1, 2, 3 of the first application, always expressing the tendency of avoiding regularity in these deposits and regular repetition of patterns in the appearance of the entire product.

Figure 9:
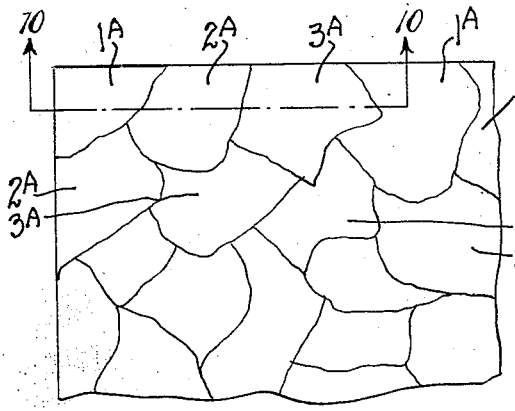
Figure 10:
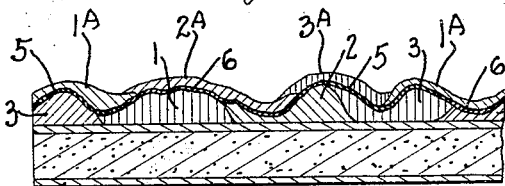

While these deposits 1$^A$, 2$^A$, and 3$^A$ of the second application of the base material are still in plastic condition, they are subjected to a pressure for spreading them without necessarily producing an overlapping relation. For this purpose a squeegee or the like may be used which may reduce the entire layer to a slightly more uniform height, still leaving, however, some parts raised above other parts, so that the deposits 1$^A$, 2$^A$ and 3$^A$ appear more pronouncedly in the deeper area portions, see Figs. 9 and 10, which resulted from the previous treatment of the board.

This layer including the second application of the variegated base materials is then permitted to dry on the lower layers which also become dryer.

Where the material is relatively thin, the film-like portions of the mass may become thoroughly dry and hard. The higher thicker points of the deposits, however, do not thoroughly dry and may be somewhat soft and contain moisture.

Figure 11:
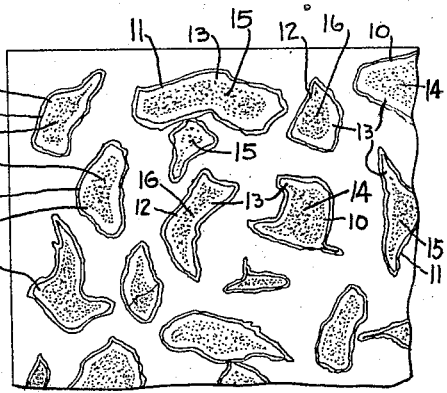
Figure 12:
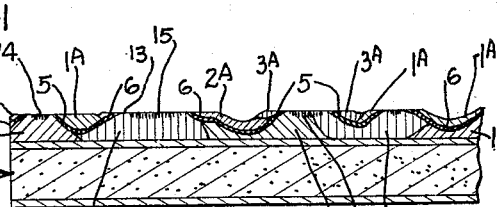

In this condition the board is conveyed through a sanding machine, preferably a drum sander, adjusted in respect of the product, so that the tops only of the higher areas are removed, and that surface which is produced by the removal of these tops is then finished on a belt sanding machine by sandpaper of suitable fineness. At those areas 10, 11, 12, Fig. 11, at which a removal of the top layer has taken place, i. e., at the higher deposits, the outer zones have become quite dry due to oxidation of the oil. The zones 13, Fig. 11, on which the drying has progressed may in the average not be wider than one-eighth or three-sixteenths of an inch, but will be narrower at some points so as to be reduced practically to contour lines of these areas 10, 11, 12. Inwardly of these zones 13, however, the linseed oil in the base liquid has not become oxidized, and hence on these areas 14, 15, 16 Figs. 11 and 12, the mass is dry, but no oxidation took place; the water only having evaporated. This condition is illustrated in Figs. 11 and 12, where these non-oxidized areas on the higher deposits are shown irregularly distributed over the entire surface, these areas having their top surfaces in the same plane. While in the outer margins 13 of these area portions, oxidation of the oil has taken place, the area portions, 14, 15, 16 confined by the zones 13 may present a somewhat spongy surface.

In this condition of the product the glazing coats are again applied, and these glazing layers again in different shades of color are spread over the uneven surface of the product in a manner similar to that described in connection with the application of the first glazing materials. The glaze is applied by brushes over irregularly distributed areas on the board, so that again the areas occupied by the same color of glaze have about the same content but by no means similar outlines. They may also be applied in streaks or blotches. These glazing materials to form the top layer of the product are similar to the glazing materials that have been first applied. One coat is preferably made of base liquid and blue, and another coat is preferably made of base liquid and green, but while the first glazing coat in blue contained the ingredients in the proportion of two gallons of base liquid to one ounce of pure blue, the glazing applied on top of the product now contains the same materials preferably in the proportions of two gallons of base liquid to one-half ounce of cobalt blue. The mixture is again produced by adding small quantities of the cobalt blue to the base liquid and stirring the mass until the desired consistency and shade of color has been produced. Also the second top glazing coat made up of base liquid and green contains these ingredients in the proportions of two gallons of base liquid to one ounce of dark chrome green, and again produced by adding small quantities of the paint to the heated base liquid while thoroughly agitating the same.

Figure 13:
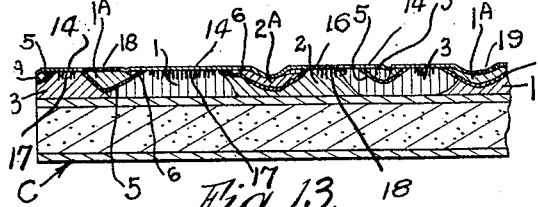

It will be noted that the glazes 17 and 18 (Fig. 13) forming the top layer as specified above are approximately in the same colors as the lower glaze materials. This fact is not essential nor is it essential that the glazing material should be restricted in color to those specified above.

Owing to the fact that the restricted areas 14, 15, 16 of the surface of the product have a greater absorptive power for this glaze material than other surface portions, differential color effects will be produced. Where the glazing 17 and 18 is applied over the oxidized zones 13 the glaze will simply cover these zones, but will not be absorbed thereby. As however, the areas 14, 15, 16 are formed by a more absorbent surface portion, the glaze will soak into these areas of the material with each brush coat applied and will become darker by each applied coat and will blend or mix to a greater or smaller degree or contrast with the underlying coloring material. The entire effect is similar to that of opalescence as encountered in natural products which are highly appreciated on account of their artistic values.

After the desired or entire surface of the board has been treated with this top coat of glazings 17 and 18 and the desired coloring effect is obtained, the surplus glazing is immediately removed with a rubber squeegee or absorbent cloths and the surface is allowed to thoroughly dry which may require 24 to 48 hours.

Figure 14:
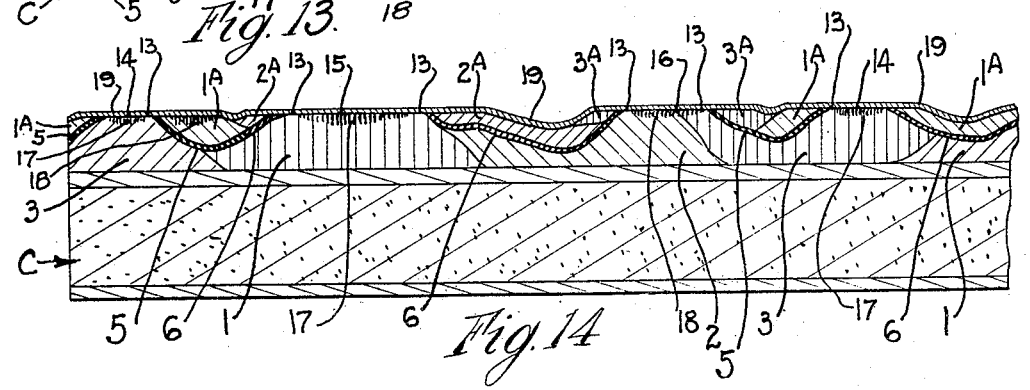

After the product is dry, it may be finished by spraying with lacquer 19, and if necessary by repeating this lacquer spraying operation. By that time even those area portions which were spongy and porous at the time the second set of glazing coats had been applied have become as dry as the other portions due to oxidation, so that the material is now fully dry on the board and there is no tendency of softening with increasing age. To the contrary, the whiting and linseed oil forming the main ingredients of the base material form a substance which after admixture with water and the like increases in hardness through the oxidation of the linseed oil, and owing to this tendency of becoming harder, the material has surprising wearing qualities. A cross-section of the finished product is diagrammatically shown in Fig. 14.

I claim:—

1. In a method of producing decorative material the steps of applying deposits of plastic material in different colors in spaced relation over the surface of a carrier, causing the deposits to merge into each other along marginal zones, and applying different coats of glazing in different areas over the surface of the layer.

2. In a method of producing decorative material the steps of applying deposits of plastic material in different colors in spaced relation over the surface of a carrier, spreading the deposits into each other along marginal zones while leaving the surface of the deposits after spreading unevenly and applying different coats of glazing over different irregular surface portions of the spread deposits.

3. In a method of producing decorative material the steps of applying deposits of plastic material in different colors in spaced relation to each other but in uniform relation as to colors over the surface of a carrier, causing the deposits to merge into each other along marginal zones, drying the deposits and applying coats of glazing in irregular streaks and in different colors over the surface of the dried material.

4. In a method of producing decorative material the steps of applying deposits of plastic materials in different colors in spaced relation over the surface of a carrier, spreading the deposits to merge into each other along marginal zones while maintaining the surface of said deposits in uneven condition, drying the deposits, applying different coats of glazing over different surface portions of the spread material and repeating the application of deposits of plastic material of different colors over the glazed area.

5. In a method of producing decorative material the steps of applying deposits of plastic materials in different colors in spaced relation over the surface of a carrier, spreading the deposits to merge into each other along marginal zones, drying the deposits, applying different coats of different colored glazing material over different areas of the plastic material, and again applying deposits of plastic materials in different colors over the glazed surface, said second application of deposits in different colors being effected while maintaining a relation of said deposits different from said first application of the plastic material.

6. In a method of producing decorative material the steps of applying deposits of plastic material in different colors in spaced relation over the surface of a carrier, spreading the deposits into each other along marginal zones, applying coats of different colored glazings over different surface portions of the spread material until the entire surface of said material is covered by the combined glazing areas, applying additional deposits of plastic materials in different colors over the glazed surface, and partly leveling the last named deposits by removing the high portions of the same.

7. In a method of producing decorative material the steps of applying deposits of plastic materials in different colors in spaced relation over the surface of a carrier, causing the deposits to merge into each other along marginal zones, drying said deposits, applying different coats of glazing over the surface of the spread material, applying again deposits of the same plastic materials in different colors in spaced relation over the glazed surface, said plastic material containing an oxidizable oil, and setting up different stages of oxidation in different portions of said deposits.

8. In a method of producing decorative material the steps of applying deposits of plastic materials in different colors in spaced relation over the surface of a carrier, spreading the deposits into each other, applying differently colored coats of glazing over the surface of the merged material until the entire surface has been coated by the glazing, applying deposits of plastic material in different colors in spaced relation over the glazed surface, spreading said deposits into each other without leveling the uneven surface thereof, admitting air to different portions of the deposit to a different degree to cause differential oxidation of the material contained in the deposits, removing portion of said applied materials to present unoxidized and partially oxidized surfaces, and applying coats of glazing to said differential oxidized surface portions.

9. In a method of producing decorative material, the steps of applying deposits of plastic material in different colors over the surface of a carrier, spreading said deposits into each other and producing differential oxidizing effects in the ingredients of which the plastic material is composed.

10. In a method of producing decorative material, the steps of producing differential color effects on different colored batches of plastic material to form a surface by applying liquid coloring material to the plastic material having area portions of differential absorptive qualities.

11. In a method of producing decorative material, the steps of applying to a carrier a base material formed of batches of different colored plastic base materials containing an oxidizable oil, differentially oxidizing the oil on different area portions of the deposit, and coloring the unoxidized portions.

12. In a method of producing decorative material, the steps of applying on a carrier deposits of irregular depth and cross-section of base material in different colors and containing an oxidizable oil, drying the base material differentially at different portions to produce differential oxidation of the oil in different portions of the base material, removing portions of irregular outline from the higher areas of said material, and applying a glaze of different color on the said removed portions.

In witness whereof I affix my signature.

JOHN J. WEBER.